(12) United States Patent
Norcott

(10) Patent No.: US 7,124,141 B2
(45) Date of Patent: Oct. 17, 2006

(54) METHOD AND APPARATUS FOR PARTITIONED BASED PURGING OF DATA

(75) Inventor: William D. Norcott, Hollis, NH (US)

(73) Assignee: Oracle International Corporation, Redwood Shores, CA (US)

(*) Notice: Subject to any disclaimer, the term of this patent is extended or adjusted under 35 U.S.C. 154(b) by 265 days.

(21) Appl. No.: 10/266,074

(22) Filed: Oct. 7, 2002

(65) Prior Publication Data

US 2003/0220938 A1 Nov. 27, 2003

Related U.S. Application Data

(60) Provisional application No. 60/384,727, filed on May 31, 2002, provisional application No. 60/383,485, filed on May 24, 2002.

(51) Int. Cl.
*G06F 17/30* (2006.01)

(52) U.S. Cl. .................. 707/101; 707/100; 707/102

(58) Field of Classification Search ..... 707/100–104.1; 711/133–136; 717/151
See application file for complete search history.

(56) References Cited

U.S. PATENT DOCUMENTS

| | | | |
|---|---|---|---|
| 5,963,934 A * | 10/1999 | Cochrane et al. ............ 707/2 |
| 6,012,126 A * | 1/2000 | Aggarwal et al. .......... 711/133 |
| 6,442,543 B1 * | 8/2002 | Snodgrass et al. ............. 707/3 |
| 6,789,071 B1 * | 9/2004 | Kapoor et al. ................. 707/2 |
| 2003/0212789 A1 * | 11/2003 | Hamel et al. ............... 709/225 |

* cited by examiner

*Primary Examiner*—Jeffrey Gaffin
*Assistant Examiner*—Neveen Abel-Jalil
(74) *Attorney, Agent, or Firm*—Perman & Green, L

(57) ABSTRACT

Fast purging of change data from a named change data database table by: (1) partitioning the table into partitions to separate data to be retained from data to be dropped and dropping the partition holding the data to be purged; or (2) creating a temporary change data database table and inserting the change data to be retained into a temporary table, dropping the named change data table, renaming the temporary table as the named table and inserting the change data within the temporary table into the renamed change table; or (3) creating a temporary change data table and copying data above a given value from the named table into the temporary database table, truncating the named table and inserting the data from the temporary into the named table and dropping the temporary table.

21 Claims, 4 Drawing Sheets

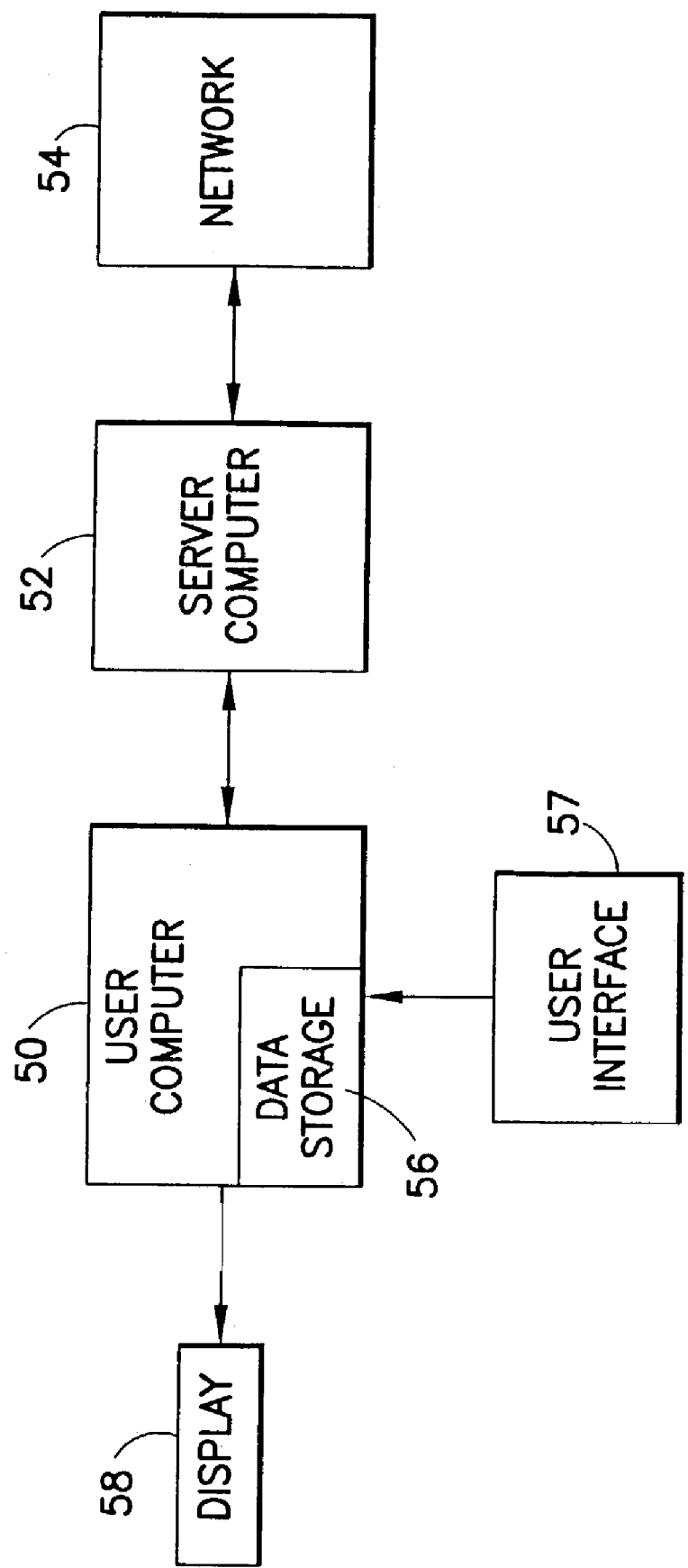

METHOD AND APPARATUS FOR PARTITIONED BASED PURGING OF DATA

CROSS-REFERENCED TO RELATED APPLICATIONS

The present application is related to U.S. patent application Ser. No. 10/140,818 entitled "Method and Apparatus for Change Data Capture in a Database System" filed on May 9, 2002 by William D. Norcott et al.; U.S. Provisional Patent Application Ser. No. 60/383,485 entitled "Method and Apparatus For Partitioned Based Purging Of Data" filed May 24, 2002 by William D. Norcott; and U.S. Provisional Patent Application Ser. No. 60/384,727 entitled "Capture Of Change Data Tables From An Online Transaction Processor Database To A Warehouse Analysis Database" filed on May 31, 2002 by William D. Norcott, the contents of each are incorporated herein by reference.

BACKGROUND OF THE INVENTION

1. Field of the Invention

The present disclosure relates to methods and systems for fast purging of data from, for example, change data tables within database applications without the use of the SQL DELETE statement.

2. Brief Description of Related Developments

As described in the above identified pending patent applications, a subscriber of change data capture system captures all the updates including SQL INSERT, DELETE and UPDATE statements that occur to interesting tables in a relational database, and stores the change data in a set of relational tables referred to as change tables.

As described in the above pending patent applications, the subscriber (user) of the Change Data Capture systems calls the EXTEND_WINDOW and PURGE_WINDOW interfaces to consume data from change tables. This also indicates to the system that the subscriber has finished with some of the change data, and therefore that data can be safely deleted from the system. It is important to delete change data once all the subscribers are finished with it, due to the large amount of change data that is constantly added to change tables. It is expensive and impractical to allow change data to remain on the database system that is no longer in use. However, the system ensures that the change tables do not grow without limit.

Existing purge mechanisms rely on the conventional SQL DELETE statement, whose performance degrades as the change table grows and as the number of rows to be deleted increases.

SUMMARY OF THE INVENTION

The present methods and systems purge selected change data from a named change data database table without using the SQL DELETE statement.

In one embodiment, the ALTER TABLE SPLIT PARTITION statement is executed on a named change data table that includes data to be purged. The NAMED_CT table is created with a single partition range P1 based on system change numbers (CSCN$) set to the maximum possible value of an SCN. Therefore, all change records are originally inserted into partition P1, regardless of their SCN values. To purge data, using ALTER TABLE SPLIT PARTITION, partition P1 is partitioned into partitions P1 and P2 at CSCN$ values above and below a low water mark (LWM) or other reference value. When this operation completes, the data to be purged is now in partition P2, while the data to be kept is in partition P1.

Partition P2 is dropped via ALTER TABLE DROP PARTITION, leaving the NAMED_CT table with just the data within partition P1.

Partition based purge using ALTER TABLE SPLIT PARTITION performs up to 50 times faster than the conventional DELETE statement.

Still another embodiment includes creating a temporary change data table from a named change data table and copying the change data from the named table into the temporary table, dropping the named table and renaming the temporary change data table as the named change data table.

In still another embodiment, purging of change data from a named change data database table is achieved by creating a temporary change data database table and inserting change data from the named table having values greater than a finite value within a range of values into the temporary change table and dropping the named change table. Next, the temporary change table holding the change data is renamed as the named change data.

BRIEF DESCRIPTION OF THE DRAWINGS

The foregoing aspects and other features of the present invention are explained in the following description, taken in connection with the accompanying drawings, wherein:

FIG. 4 is a block diagram of one embodiment of an apparatus that can be used to practice the present invention.

DETAILED DESCRIPTION OF THE PREFERRED EMBODIMENT(S)

Figure 1:
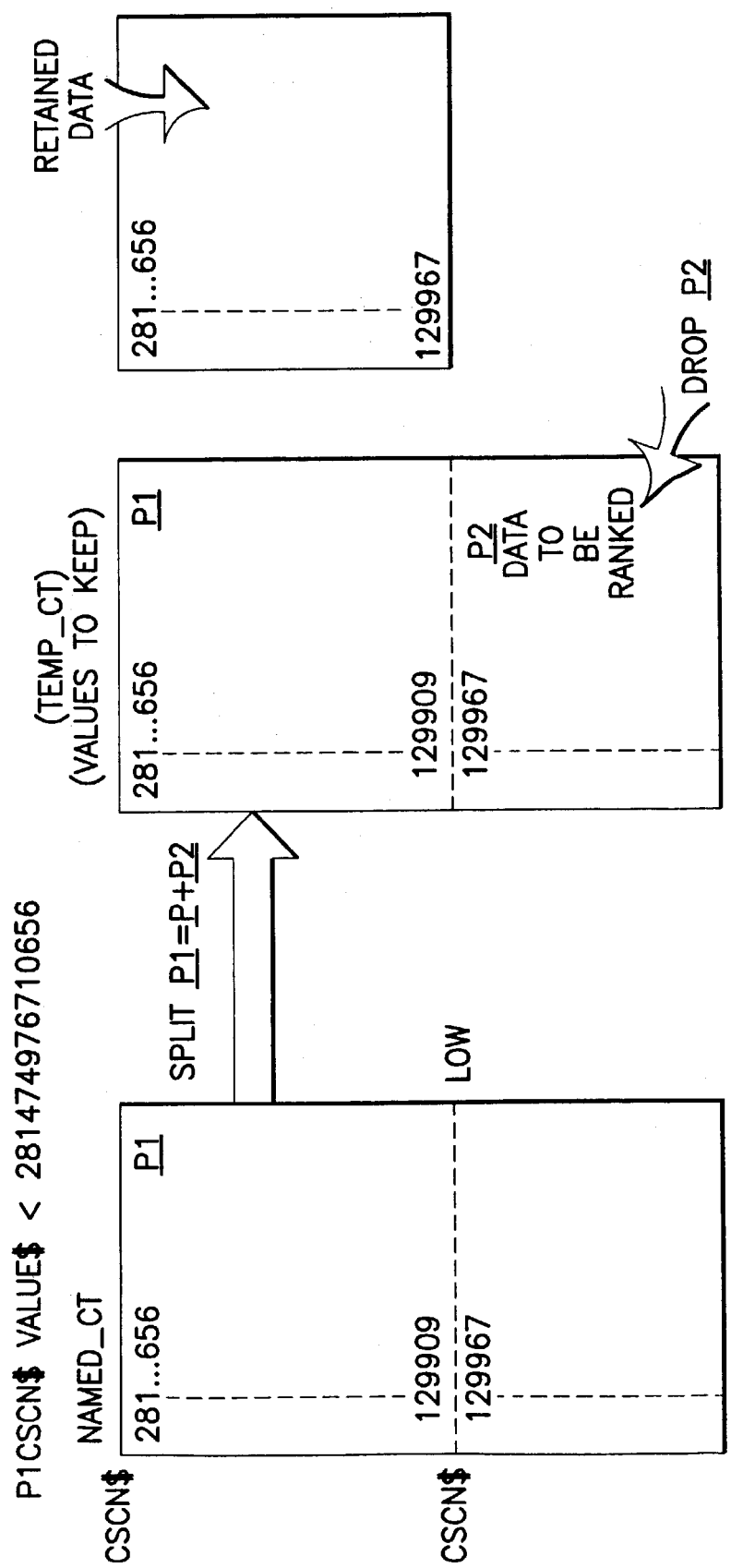
FIG. 1 depicts first methods and systems for purging selected data from a named change data table.

Because the change data is stored as rows in relational tables, it is common to use the SQL DELETE command on statement to delete the rows. However, when a table is very large, deleting rows using the conventional DELETE command statement is a very time consuming operation and a resource intensive one. It should be noted that the references to commands or statements are meant to be exemplary, which would be understood by one of skill in the art, and the general functionality of these commands or statements are incorporated herein by reference.

For change data capture it is generally known that all the rows older than for example a certain date are no longer needed in the change table. Therefore, a user can delete a set of rows that were added to the database at the same time. In terms of physical storage, these rows tend to be physically clustered in the table, and tend to occupy contiguous and physically adjacent locations on the hard disks or memory that store the data for the table. The present disclosed methods and systems take advantage of this fact to make the purge operation much more efficient.

Unfortunately, the DELETE command or statement has no knowledge of the physical clustering of the data. Furthermore, if it were a conventional online transaction processing ("OLTP") transaction, a DELETE statement might need to be undone or cancelled using for example, the ROLLBACK statement. Therefore, the entire purge operation is logged using the redo log mechanism present in any modern relational database (in this case, the Oracle database). However, it is a fact that once we purge the data it should be gone forever, and there is, in fact, no need to log the data.

For these reasons and several other reasons, the purge operation using the DELETE statement is very expensive both in terms of time and computer resources.

The current disclosure describes a much more efficient method of purging the data, using the partition management operations that are present in the release of the Oracle 9i database system. However, the disclosure is not limited to use by an Oracle database system; other database management systems that use partitions or similar mechanisms for storage management can take advantage of this invention.

The conventional purge operation that uses DELETE operates by deleting those rows representing transactions that were earlier than a certain reference point such as a point in time. Moreover, the change table itself supports this because it has a column named CSCN$, which is the 'commit SCN', or reference number of the transaction. SCN is an abbreviation for "system change number" which is a unique, increasing number that is generated for each committed transaction.

For example, suppose the change table is named SCOTT.TQCCSUB9CT. If the oldest transaction we wish to keep in the change table is 129967, then the conventional method is to issue a DELETE statement such as:
DELETE FROM SCOTT.TQCCSUB9CT <129967.

The general effect of this statement is to delete all transactions having a reference less than 129967.

The current purge data methods and systems are much faster than the prior art methods and systems and yet will be understood by engineers and other database professionals of ordinary skill within the database arts.

One key to the disclosed fast methods and systems is the insight to create a change table as a partitioned table. Then, perform partition operations on the change table to perform the purge, such that, the rows sought to be purged fall into one partition, and the rows to keep fall into a second partition.

Referring to FIG. 1, the table is created with a single, large partition whose partition key is the CSCN$ column, as follows:
CREATE TABLE SCOTT.TQCCSUB9CT
PARTITION BY RANGE (cscn$)
PARTITION P1 VALUES LESS THAN (281474976710656);

This creates the table with a single partition, named P1. All rows whose value of CSCN$ is less than 281474976710656 will be inserted into partition P1. However, the maximum value of all possible SCN$, a constant, also happens to be 281474976710656. Therefore, all rows regardless of their value of CSCN$ are inserted into the partition P1.

Now, suppose that the subscriber has performed the PURGE_WINDOW operation that has set the lowest SCN to be retained to "commit SCN" of 129967. This is just as in the previous example using the conventional method.

We now issue the ALTER TABLE . . . SPLIT PARTITION statement to put the values we want to keep (those greater than or equal to 129967) into one partition P1, and those to be discarded into another partition P2.
ALTER TABLE SCOTT.TQCCSUB9CT
SPLIT PARTITION p1 AT (129967)
INTO(PARTITION p2, PARTITION p1) PARALLEL'
Note that before the ALTER TABLE operation, the change table consists of a single partition P1 containing both the rows to be purged, and those we want to keep. However, after the ALTER TABLE, SPLIT PARTITION statement is executed, the rows to be purged have all been segregated into a new partition, P2, and the rows to be kept have been placed into a new partition P1, that replaces the old partition of the same name. That is, the old partition P1 is destroyed. Note that no data is lost, rather the data from the original partition P1 is moved either into the new partition P1, or the new partition P2.

Now that the data to be purged has been segregated into the partition P2, it is extremely fast to delete all those rows by dropping the entire partition P2:
ALTER TABLE SCOTT.TQCCSUB9CT DROP PARTITION p2'
Note that at the end of this sequence, all the rows we wish to keep are now in partition P1, and all the rows to be purged have been purged from table
SCOTT.TQCCSUB9CT.

Note that no DELETE operation has been required to purge the rows, therefore, the high overhead of removing rows with DELETE has been entirely avoided.

Note also that no redo logging is performed, which reduces the execution time and system resources needed to perform the purge.

Alternatives

The "two" ALTER TABLE partitioning statements are the best and most efficient means of purging the rows. However, alternative methods and systems provide less efficient purging of change table data but are yet improvements over the use of the DELETE type of command.

Figure 2:
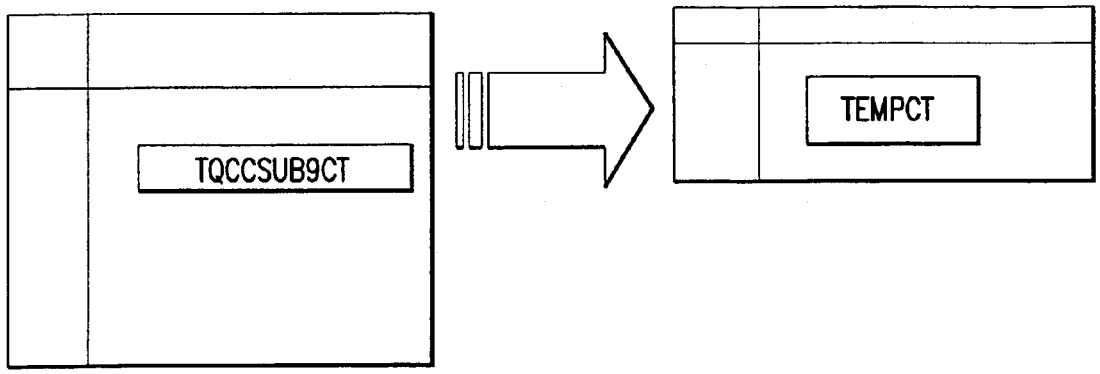
FIG. 2 depicts second methods and systems for purging selected data from a named change data table.
Figure 2:
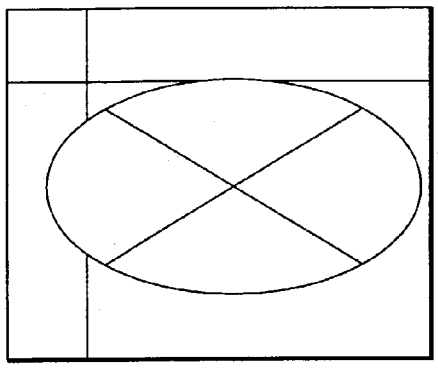
Figure 2:
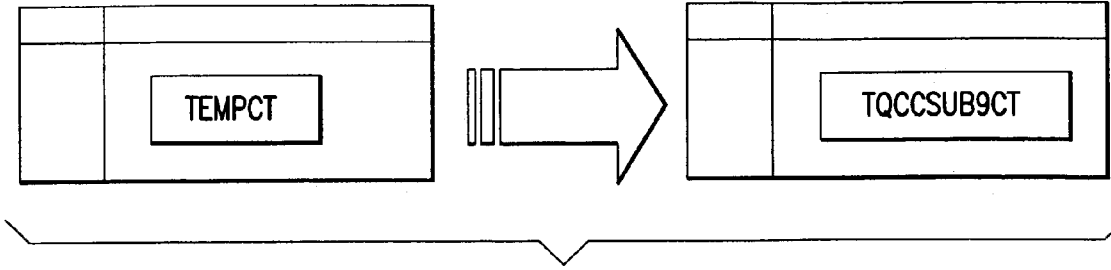

The two alternatives are:
CREATE TABLE TEMPCT AS SELECT * FROM SCOTT.TQCCSUB9CT WHERE 0=1;
INSERT INTO TEMPCT SELECT*FROM SCOTT.TQCCSUB9CT WHERE CSCN$>129967;
DROP TABLE SCOTT.TQCCSUB9CT;
RENAME TABLE TEMPCT TO SCOTT.TQCCSUB9CT;

And:
CREATE TABLE TEMPCT AS SELECT * FROM SCOTT.TQCCSUB9CT WHERE CSCN$>129967;
TRUNCATE TABLE SCOTT.TQCCSUB9CT;
INSERT INTO SCOTT.TQCCSUB9CT SELECT*FROM TEMP;
DROP TABLE TEMP;

Referring to FIG. 2 in the first alternative embodiment, a new temporary change table TEMPCT is created and populated with the rows we want to keep. Then we drop the original change table SCOTT.TQCCSUB9CT, and rename TEMPCT to SCOTT.TQCCSUB9CT. This has the identical effect of leaving SCOTT.TQCCSUB9CT with just those rows we want to keep, while purging the rows to be eliminated. This alternative method also has a great performance advantage over the conventional DELETE statement, roughly 10 times faster, and would be a suitable solution for database systems that do not support partitioning operations. Although this is a suitable method for avoiding the DELETE statement under this invention, this alternative method using data copy is slower than the partitioning method disclosed herein, and may require table locking.

Figure 3:
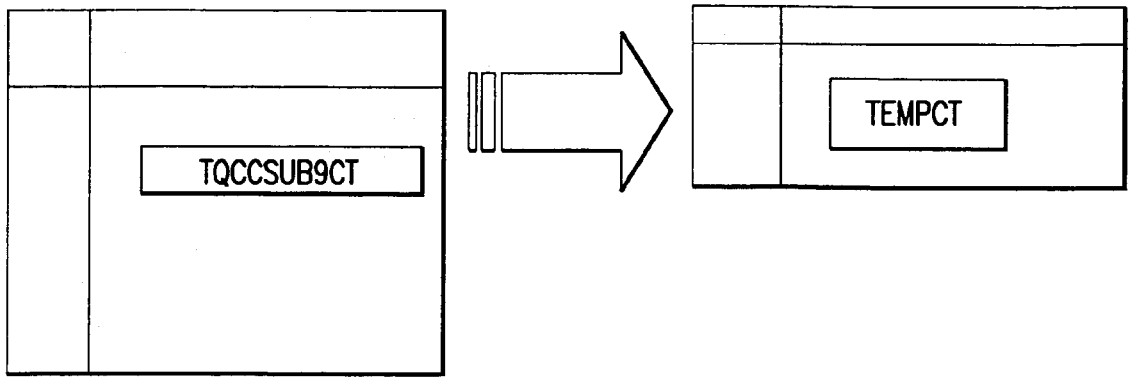
FIG. 3 depicts third methods and systems for purging selected data from a named change data table.
Figure 3:
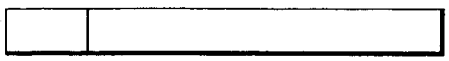
Figure 3:
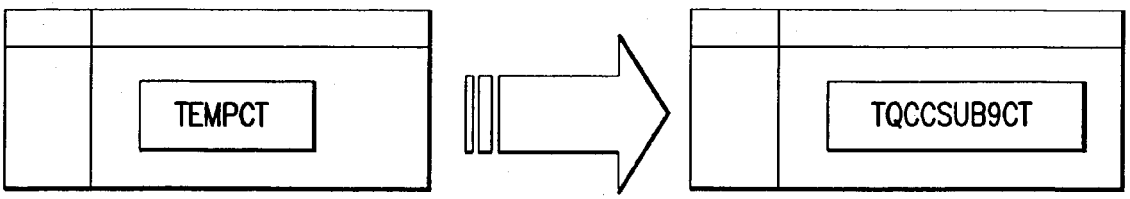
Figure 3:
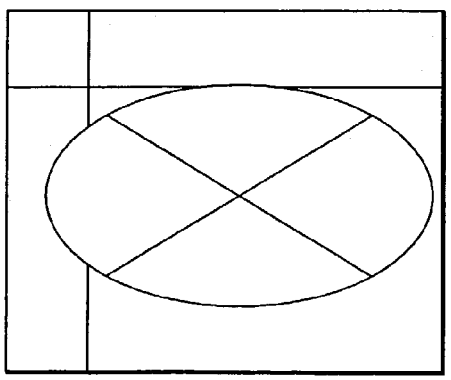

Referring to FIG. 3, in the second alternative embodiment of method, we create a temporary table TEMPCT, and copy into it all the data that is to be retained from TQCCSUB9CT. We then truncate the change table SCOTT.TQCCSUB9CT to quickly remove all of its rows. We then copy the data from TEMPCT back into SCOTT.TQCCSUB9CT. Finally, we drop table TEMPCT.

The advantage of the partition-based purge of the present invention is that it is up to 50 times faster than a conventional DELETE statement, and that it uses far less system resources in terms of redo logs, temporary segments and rollback segments. The present invention generally requires that the database support partitioning operations, and that the customer has purchased the partitioning option and so has rights to use the partitioning operations.

The "copy to temp table" method is over 10 times faster than a conventional DELETE, and is suitable if partitioning is not available or is not licensed.

This disclosure is not limited to use with change tables, but that the method and apparatus is generally useful for purging all types of data from all type of tables, where it is possible to segregate the data according to the value of a single column, and moreover to sort the data by a simple inequality such as "greater than" or "less than". One familiar with database management systems will see that these are simple properties that apply to many forms of data in the business world, and that the current disclosure is a generally useful mechanism not limited to change data capture per se, or to data warehousing. It is equally useful in the OLTP environment whenever amounts of data need to be purged from large relational tables.

In the database, marketplace performance means everything. Being able to purge data 50 times faster than before means that an operation that once tied up the system for hours now takes only a few minutes to complete.

As noted above the current disclosure is a general purpose and generally, useful mechanism for purging data from large tables much faster than is possible using the conventional DELETE statement. It is equally useful for all Oracle customers whether they are OLTP or data warehousing customer.

The present invention may also include software and computer programs incorporating the process steps and instructions described above that are executed in different computers. In the preferred embodiment, the computers are connected to the Internet. FIG. 4 is a block diagram of one embodiment of a typical apparatus incorporating features of the present invention that may be used to practice the present invention. As shown, a computer system 50 may be linked to another computer system 52, such that the computers 50 and 52 are capable of sending information to each other and receiving information from each other. In one embodiment, computer system 52 could include a server computer adapted to communicate with a network 54, such as for example, the Internet. Computer systems 50 and 52 can be linked together in any conventional manner including a modem, hard wire connection, or fiber optic link. Generally, information can be made available to both computer systems 50 and 52 using a communication protocol typically sent over a communication channel or through a dial-up connection on ISDN line. Computers 50 and 52 are generally adapted to utilize program storage devices embodying machine readable program source code which is adapted to cause the computers 50 and 52 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 50 and 52 may also include a microprocessor for executing stored programs. Computer 50 may include a data storage device 56 on its program storage device for the storage of information and data. The computer program or software incorporating the processes and method steps incorporating features of the present invention may be stored in one or more computers 50 and 52 on an otherwise conventional program storage device. In one embodiment, computers 50 and 52 may include a user interface 57, and a display interface 58 from which features of the present invention can be accessed. The user interface 57 and the display interface 58 can be adapted to allow the input of queries and commands to the system, as well as present the results of the commands and queries.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method in a computer system for purging change data from a named change data database table in a relational database application resident on a computer system comprising:

partitioning, in the computer system, the named change data database table in the relational database application into a single partition P1 having a finite range of value;

splitting, in the computer system, partition P1 at a value within a finite range of values into partition P2 and partition P1 and dropping, in the computer system, partition P2 from the relational database application named database table, wherein the change data is purged from the named change data database table.

2. The method of claim 1 wherein partition P2 includes only values to be purged.

3. A method executed in a computer system for purging change data from a named change data database table in a database application of the computer system comprising:

creating, in the computer system, a temporary change data database table, inserting change data from the named change data database table having values greater than a finite value within a range of values into the temporary change data database table, dropping the named change database table; and renaming the temporary change data database table with the name of the named change table database table, wherein the change data is purged from the named change data database table.

4. A method executed in a computer system for purging data from a named change data database table of the computer system comprising:

creating, in the computer system, a temporary change data database table and copying into the temporary change data database table, data above a finite value within a range of values;

truncating the named change data database table;

inserting the change data within the temporary change data database table into the named change data database table; and dropping the temporary change data database table to purge the data from the named changed data database table.

5. A computer program product comprising:

a computer useable medium embodied in a computer system having computer readable code means embodied therein to cause a computer to execute instructions to cause the computer to purge change data from a named change data database table, the computer readable code means in the computer program product comprising:

computer readable program code means to cause the computer to execute instructions to cause the computer to partition the named change data database table into a single partition having a finite range of values;

computer readable program code means to cause the computer to execute instructions to cause the computer to split the single partition at a value within the finite range of values into a first partition and a second partition; and computer readable program code means to cause the computer to execute instructions to cause the computer to drop the second partition from the named change data database table and purge the change data from the named changed data database table.

6. An article of manufacture comprising:

a computer useable medium having computer readable program code means embodied therein to cause a computer to execute instructions to cause the computer to purge change data from a named change data database table, the computer readable code means in the article of manufacture comprising:

computer readable program code means to cause the computer to execute instructions to cause the computer to create a temporary change data database table in a relational database application;

computer readable program code means to cause the computer to execute instructions to cause the computer to insert change data from the named change data database table, having values greater than a finite value within a range of values, into the temporary change data database table;

computer readable program code means to cause the computer to execute instructions to cause the computer to drop the name change data database table; and computer readable program code means to cause the computer to execute instructions to cause the computer to rename the temporary change data database table with the name of the named change data database table within the relational database application.

7. The method of claim 1 wherein the change data database tables comprises a set of relational database tables that capture all updates to tables in the relational database.

8. The method of claim 1 wherein change data in the named change data database table includes all updates resulting from SQL INSERT, DELETE and UPDATE statements.

9. The method of claim 1 further comprising purging data from the named change data database table without using a SQL DELETE statement.

10. The method of claim 9 wherein the purge of data is a fast purge of data.

11. The method of claim 1 wherein a table created by the single partition P1 is based on system change numbers.

12. The method of claim 11 further comprising the splitting of partition P1 above and below a referenced system change number.

13. The method of claim 12 further comprising dropping partition P2 using an ALTER TABLE DROP PARTITION statement.

14. The method of claim 1 further comprising creating the single partition P1 wherein a partition key is a system change number column.

15. The method of claim 1 further comprising the single partition P1 comprising rows of the database table to be retained and rows of the database table to be purged.

16. The method of claim 15 wherein the split partition P1 includes the rows of the database table to be retained and split partition P2 includes the rows of the database table to be purged.

17. The method of claim 1 further comprising dropping partition P2 without redo logging.

18. The method of claim 3 wherein the inserted change data comprises rows of data in the named change database table to be retained.

19. The method of claim 4, wherein the step of truncating the named change data database table further comprises removing all of the rows of data from the named change data database table.

20. The method of claim 4, wherein the step of copying further comprises copying data from the named change data database table that is to be retained.

21. An apparatus comprising:

means to cause a computer system to purge change data from a named change data database table in a relational database application on a computer system comprising:

means to cause the computer system to partition the named change data database table in the relational database application into a single partition P1 having a finite range of value;

means to cause the computer system to split partition P1 at a value within a finite range of values into partition P2 and partition P1; and means to cause the computer system to drop partition P2 from the relational database application named database table to purge the change data.

* * * * *